Oct. 2, 1945.  E. H. ERICKSON  2,386,099
CLUTCH AND BRAKE ASSEMBLY
Filed Nov. 24, 1943  2 Sheets-Sheet 1
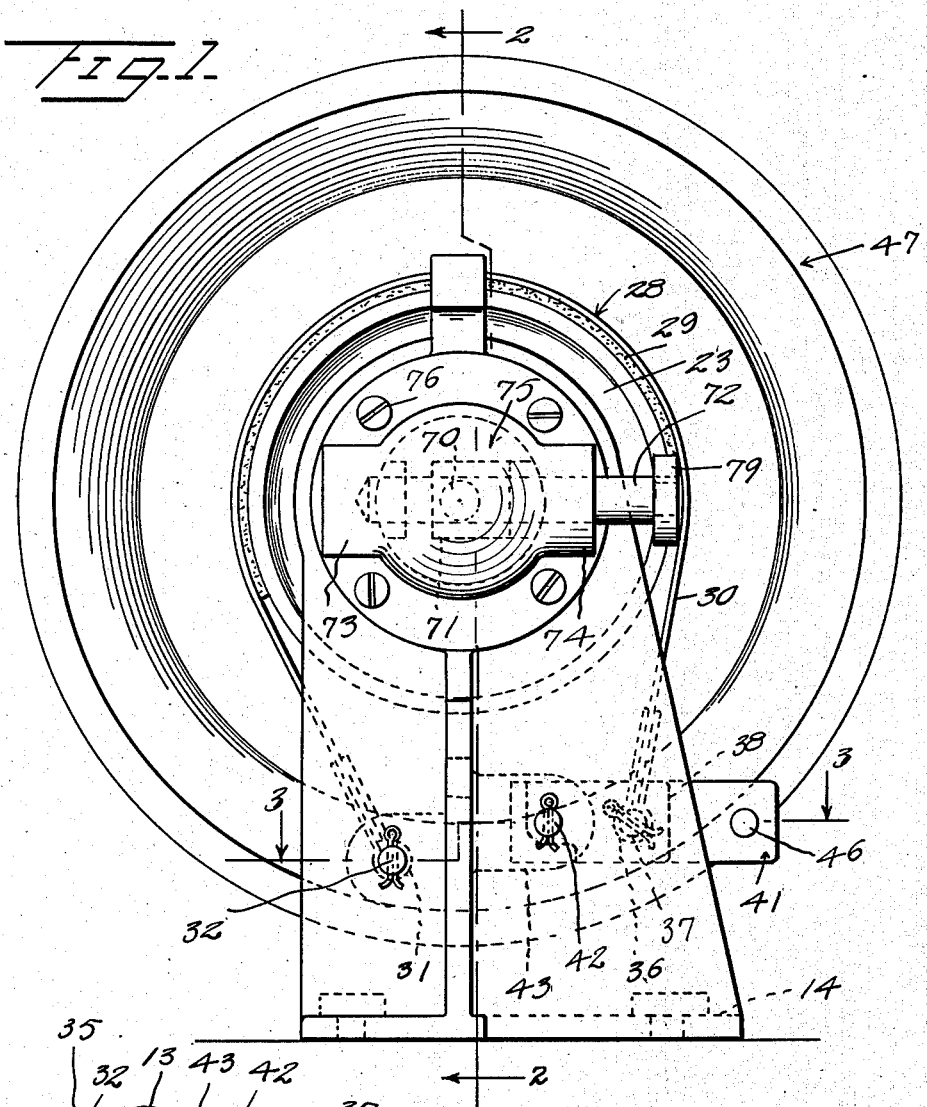

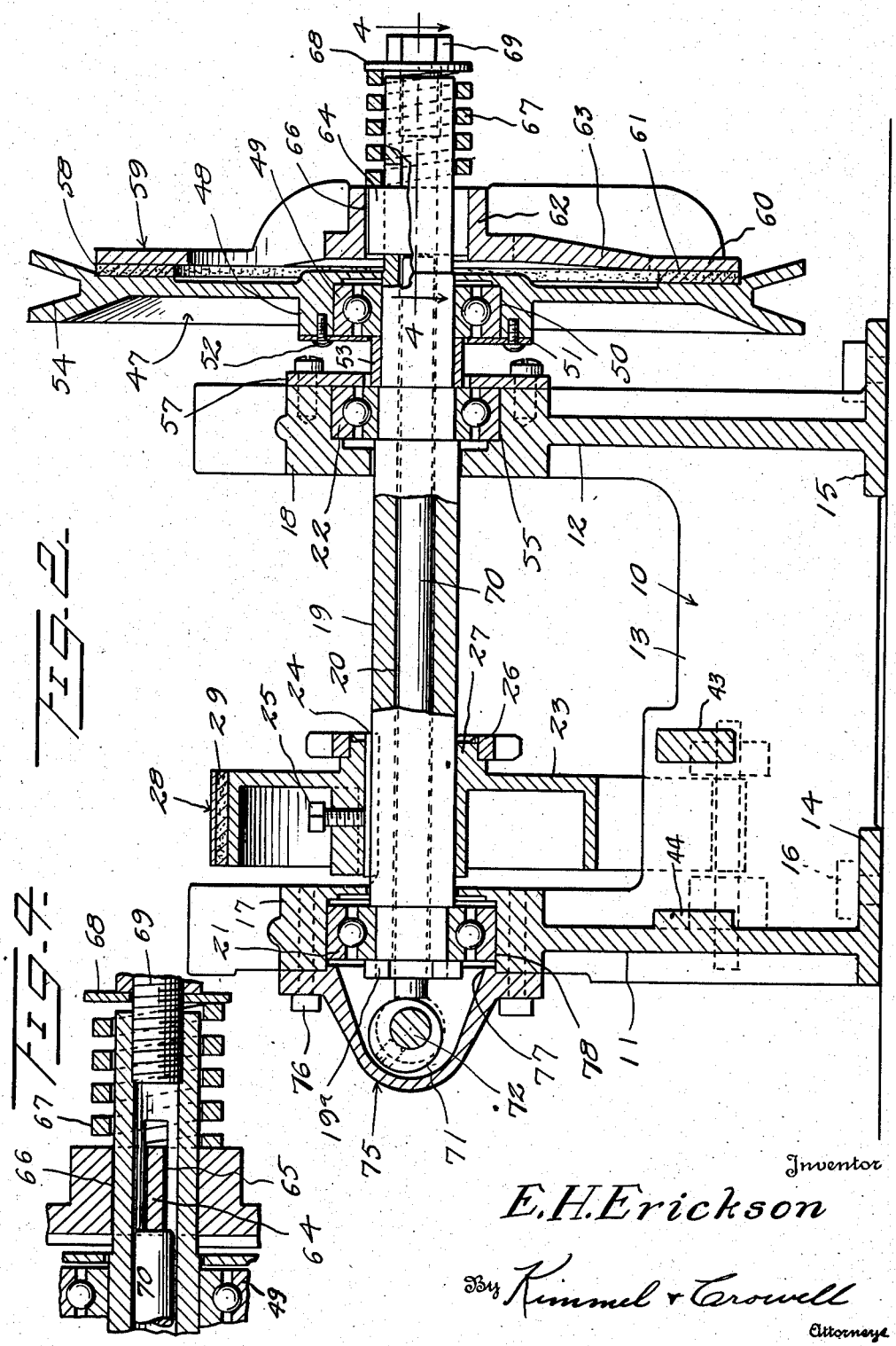

Patented Oct. 2, 1945

2,386,099

UNITED STATES PATENT OFFICE 2,386,099

CLUTCH AND BRAKE ASSEMBLY

Emil H. Erickson, La Crosse, Wis., assignor to Safticycles, Inc., La Crosse, Wis.

Application November 24, 1943, Serial No. 511,615

2 Claims. (Cl. 192—17)

This invention relates to a drive connection for a powered bicycle.

An object of this invention is to provide an improved clutch and operating means therefor whereby the operating means will be enclosed so that it will not become corroded or damaged by dirt or the like.

Another object of this invention is to provide in a clutch, a cam operator for moving the clutch to released position, the operator being enclosed in a sealed housing so that foreign particles cannot injure or interfere with the movement of the operator.

A further object of this invention is to provide an improved driving mechanism of simple construction so that it can be mounted on a two-wheeled vehicle which is provided with an internal combustion engine.

To the foregoing objects and others which may hereinafter appear, the invention consists of the novel construction, combination and arrangement of parts as will be more specifically referred to and illustrated in the accompanying drawings wherein is shown an embodiment of the invention, but it is to be understood that changes, variations and modifications may be resorted to which fall within the scope of the invention as claimed.

In the drawings:

Figure 1 is a detail side elevation of a clutch and brake assembly constructed according to an embodiment of this invention, Figure 2 is a sectional view taken on the line 2—2 of Figure 1, Figure 3 is a sectional view taken on the line 3—3 of Figure 1, and Figure 4 is a fragmentary sectional view taken on the line 4—4 of Figure 2.

Referring to the drawings, the numeral 10 designates generally a base or bearing mounting which is formed of a pair of standards 11 and 12 connected together by a web 13. The base 10 includes lower flanges 14 and 15 carried by the standards 11 and 12, through which fastening members 16 are adapted to engage for securing the base 10 on a powered bicycle frame structure. The standard 11 includes a bearing 17 at the upper end thereof, and the standard 12 includes a bearing 18 at the upper end thereof. A drive shaft 19 is journaled through the bearings 17 and 18, the shaft 19 having bore 20 therethrough, and the shaft 19 preferably is mounted in anti-friction bearings 21 and 22 carried by the bearings 17 and 18 respectively. A nut 19a is threaded onto shaft 19 and holds bearing 21 against endwise movement.

A brake drum 23 is secured as by a key 24 and a set screw 25 to the shaft 19 between the bearings 17 and 18. A driven sprocket 26 is secured in any suitable manner to the hub 27 of the brake drum 23, and the sprocket 26 is adapted to be connected by means of a chain or the like to a sprocket on the rear wheel of the vehicle.

A brake band generally designated as 28 engages about the drum 23 and includes a fibrous brake band element 29, which is secured to the inner side of a resilient metal strap 30. The strap 30 is disposed in looped relation over the drum 23, being provided with an eye 31 at one end which is mounted about a pin 32. The pin 32 is disposed through a pair of ears 33 and 34 and is held against endwise movement by cotter-pins 35 or the like. The opposite end of the band 30 is provided with an eye 36 through which a pin 37 engages. The pin 37 is disposed between a pair of parallel arms or levers 38 and 39 which are connected together by a connecting bar or bight 40. The two arms or levers 38 and 39 form a rock lever structure generally designated as 41, which is rockably mounted on a pin or shaft 42. The pin or shaft 42 is mounted on a pair of ears 43 and 44, the ear 44 being fixed relative to the standard 11 and the ear 43 extending at right angles from the web 13. The pin 42 is held against endwise movement by means of a pair of cotter-pins or other fastening means 45. The arm 39 of the lever structure 41 is substantially longer in length than the arm 38 and is provided with an opening 46 for receiving a connecting means to connect the arm 39 to a suitable brake operator.

A driving pulley or wheel 47 is loosely mounted on the shaft 19 outwardly of the bearing 18. The wheel or pulley 47 includes a hub 48 within which an anti-friction bearing 49 is mounted. The bearing 49 is held in the annular recess 50 formed in the hub 48 by means of an annular bearing retainer plate 51 secured by fastening members 52 to the inner side of the hub 48. A cylindrical spacer sleeve 53 is mounted on the shaft 19 between the bearing 22 and the bearing 49. The wheel or pulley 47 includes a V-shaped or grooved rim 54 for receiving a flexible driving structure in the form of a belt or the like. The bearing 22 is held against endwise movement in the annular recess 55 formed in the bearing 18 by means of an annular retainer plate 56 secured by fastening members 57 to the outside of the bearing 18. The wheel or pulley 47 has formed on the outer face thereof inwardly of the rim or grooved portion 54 an annular clutch face 58. A complementary clutch member 59 confronts the clutch face or element 58 and includes an annular plate 60 to which a fibrous clutch element 61 is adapted to be secured. The annular clutch member or plate 60 is formed as an integral part of the hub 62, being connected to the hub 62 by spokes 63 or the like.

The clutch member 59 is held against rotation with respect to the shaft 19 by means of a key 64, which is loosely extended through a slot 65 formed in the shaft 19. The opposite ends of the key 64 slidably engage in diametrically opposed keyways 66 formed in the hub 62. The clutch member or element 59 is yieldably held against the clutch member 58 by means of a spring 67 disposed about the shaft 19. The spring 67 at one end bears against the hub 62 and at the other or outer end bears against a washer 68 mounted on a bolt 69 which is threaded into the adjacent end of the shaft 19. In order to provide a means whereby the clutch member 59 may be selectively moved to a released position, I have provided a clutch operating rod or shaft 70 which is slidable endwise in the bore 20 of the shaft 19. One end of the rod or shaft 70 bears against the inner edge of the key 66, and the other end of the shaft 70 projects outwardly of the opposite end of the shaft 19.

A cam or eccentric 71 mounted on a cam shaft 72 is adapted to engage the adjacent end of the clutch operator 70 so that rotary adjustment of the cam 71 will shift the operator 70 endwise. The cam shaft 72 is journaled in the bearings 73 and 74, carried by a cap 75 which is fixed as by fastening members 76 to the outer side of the bearing 17. The cap 75 is formed on its inner side with an annular rib 77, which engages within the recess 78, which is provided for the bearing 21. The interior of the cap 75 is adapted to be filled with a lubricant so that the cam 71 will be constantly lubricated and the cap 75 provides a means whereby dirt or other foreign matter will be prevented from injuring or interfering with the operation of the cam and the cam shaft. The outer end of the cam shaft 72 is provided with a pin or connector 79 by means of which the shaft 72 may be connected to a suitable operator for selectively rocking the shaft 72 to clutch releasing position.

In the use and operation of this assembly, the sprocket 26 is connected by means of a chain or suitable flexible drive to a sprocket on the rear wheel of the vehicle, the base 10 being mounted on a platform provided between the front and rear wheels of a motor bicycle and a driving belt trained about pulley 47. During the normal operation of the device the spring 67 will maintain the clutch member 59 in clutching engagement with the clutch member 58 so that the driving wheel or pulley 47 will rotate as a unit with the drive shaft 19. At this time, the cam 71 is in substantially the position shown in Figure 2. The rocking of the cam 71 in a clockwise direction will move the clutch operator 70 endwise within the shaft 19, thereby moving the key 64 outwardly and compressing the spring 67. The key 64 may be tight enough in the keyways 66 so that the clutch member 59 will also be moved outwardly to a released position. However, the key 64 may have a sliding fit in the keyways 66, and under this condition the key 64 will move the inner end of the spring 67 outwardly, compressing the spring 67 and relieving the clutch member 59 of pressure against the clutch member 58 so that the wheel or pulley 47 may freely rotate on the shaft 19, or the shaft 19 may freely rotate within the hub 48 of the wheel or pulley 47.

The assembly hereinbefore described is an exceedingly compact assembly, being of very simple construction and designed for a fairly small power unit such as a unit for use with a small bicycle or 2-wheeled vehicle. The device hereinbefore described is not only compact, but is of simple and sturdy construction so that it will not readily get out of order and will provide all of the safety factors necessary in a construction of this kind.

The cap 75 which provides bearings for the eccentric cam shaft holds bearing 21 to a predetermined slidable movement within the bearing 17, provides a reservoir for a lubricant which lubricates not only the cam shaft bearings, the cam and pushrod, but also flows along the hollow shaft and lubricates the key and the shaft where the keywayed hub of the clutch member 59 slides on the shaft. It also prevents dust and dirt, which is always troublesome at this point of the vehicle, from entering.

What I claim is:

1. In a drive assembly, a hollow drive shaft, bearings for said shaft, a driven wheel rotatably carried by said shaft, a clutch element carried by said wheel, a second clutch element including a cylindrical hub having opposed keyways therein, a key slidably carried by said shaft and slidably engaging the keyways of said second clutch element for holding the latter against rotation relative to said shaft, said hub constituting the sole means for holding said key against lateral movement relative to said shaft, a spring engaging said key and said second clutch element for constantly urging the latter toward said first clutch element, a clutch releasing rod slidable within said shaft and engaging at one end against said key, a cam engaging the opposite end of said rod for moving said rod to clutch disengaging position, and a housing enclosing said cam.

2. A drive assembly comprising a base including a pair of upright standards, a webbing connecting said standards together, a bearing on the upper end of each standard, a hollow drive shaft journaled through said bearings, a driven member rotatably carried by said shaft, a clutch element carried by said driven member, a second clutch element slidable on said shaft and formed with a hub having opposed keyways therein, a transversely extending key slidable lengthwise of said shaft loosely engaging said keyways of said second clutch element for holding the latter against rotation relative to said shaft, said hub constituting the sole means for holding said key against lateral movement, a spring constantly urging said second clutch element to clutching position with said first clutch element, a rod extending through said shaft engaging said key for relieving said second clutch element of the tension of said spring, a rockable cam engaging an end of said rod, a housing enclosing said cam, and a cam shaft journaled in said housing.

EMIL H. ERICKSON.